March 12, 1963 — I. J. GABELMAN ETAL — 3,081,454
AIR TRAFFIC CONTROL SYSTEM
Filed Aug. 27, 1957 — 5 Sheets-Sheet 1

INVENTORS
IRVING J. GABELMAN
SAMUEL THALER
BY
ATTORNEY
AGENT

March 12, 1963  I. J. GABELMAN ETAL  3,081,454
AIR TRAFFIC CONTROL SYSTEM
Filed Aug. 27, 1957  5 Sheets-Sheet 2

INVENTORS
IRVING J. GABELMAN
SAMUEL THALER
BY Wade Koontz
ATTORNEY
James L. Shannon
AGENT

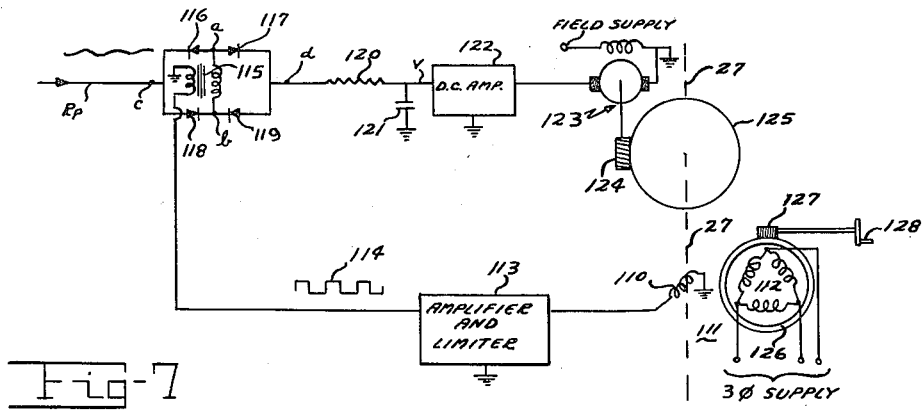
Fig-7
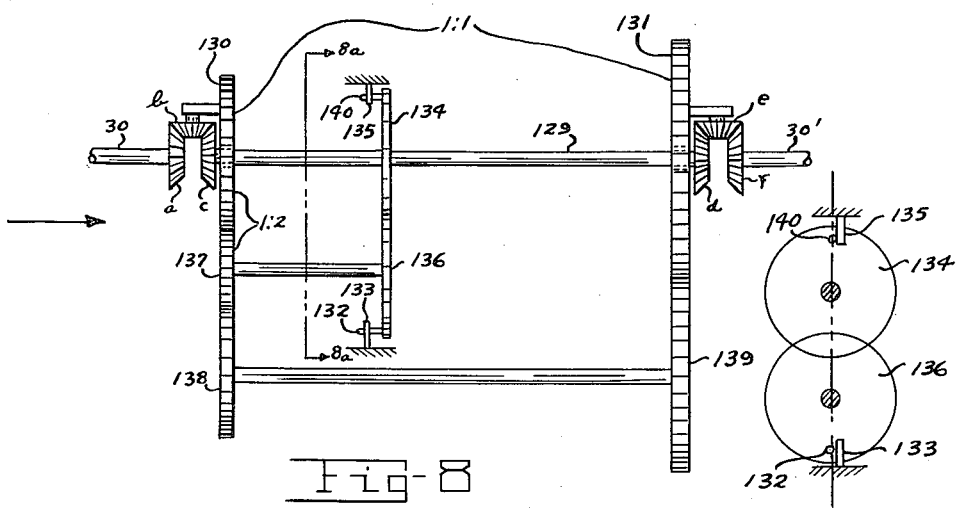
Fig-8
Fig-8a
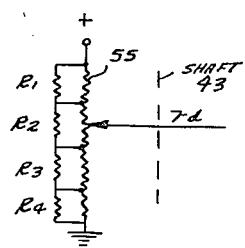
Fig-9

March 12, 1963     I. J. GABELMAN ETAL     3,081,454
AIR TRAFFIC CONTROL SYSTEM
Filed Aug. 27, 1957     5 Sheets-Sheet 5

\* RATIOS AS REQUIRED TO CONVERT
SHAFTS 69, 43 AND 30' TO SAME
TIME SCALE AS SHAFT 90

INVENTORS
IRVING J. GABELMAN
SAMUEL THALER
BY
ATTORNEY
AGENT

United States Patent Office 3,081,454
Patented Mar. 12, 1963

3,081,454
AIR TRAFFIC CONTROL SYSTEM
Irving J. Gabelman, Rome, N.Y., and Samuel Thaler, Reseda, Calif., assignors to the United States of America as represented by the Secretary of the Air Force
Filed Aug. 27, 1957, Ser. No. 680,607
9 Claims. (Cl. 343—6)
(Granted under Title 35, U.S. Code (1952), sec. 266)

The invention described herein may be manufactured and used by or for the United States Government for governmental purposes without payment to us of any royalty thereon.

This invention relates to the control of aircraft in that period that extends from the time the aircraft enters the surveillance area surrounding an airfield where it intends to land until it reaches the entry gate of the landing facility.

The principal object of the invention is to provide an air traffic control system capable of operating under high density conditions to bring aircraft in succession to the entry gate of a landing facility properly oriented and separated by a minimum time interval determined by the capabilities of the landing facility. For present day GCA (Ground Controlled Approach) and ILS (Instrument Landing System) this interval is 30 seconds.

A further object of the invention is to provide an air traffic control system that is well suited to the characteristics of jet aircraft, particularly the high rate of fuel consumption, and which operates to bring jet aircraft to the entry gate with a minimum consumption of fuel.

Another object of the invention is to provide an air traffic control system in which the aircraft are caused to fly essentially non-intersecting paths and in which any necessary deviations from such paths for the purpose of consuming time are effected at maximum range so that the danger of collision is minimized. It is also an object that the paths flown by the aircraft approach those which would normally be flown by the pilot in clear weather and in the absence of other aircraft.

Other objects are to provide an air traffic control system in which commands transmitted to the aircraft are easily understood and executed, and in which the necessary ground and air-borne equipment is held to a minimum.

The control system described is particularly adapted to use at military airfields where large numbers of jet aircraft may return from a mission to base within a comparatively short space of time.

Basically the traffic control system comprises a ground radar equipment and associated identification and tracking equipments for supplying continuous positional information on each aircraft in the control area. The positional information for a particular aircraft together with wind data, cruise altitude and cruise velocity serve as inputs to a computer or data processing unit assigned to that aircraft. From these data the computer generates a program in space and time, in accordance with the system flight path, which conveys the aircraft from its present position to the entry gate of the landing facility. The computer also determines the estimated time of arrival (ETA) at the entry gate. If the initial ETA is not in conflict with the time of arrival of any other aircraft it becomes the assigned time of arrival (ATA) and the aircraft continues to fly the program to the entry gate. If there is a conflict, the program is changed to provide a usable ETA.

The horizontal projection of the flight path programmed by the computer has the same shape for all aircraft. In the absence of wind, it consists of a straight line to a point of tangency with a final turn circle which itself is tangent to the final approach path at the entry gate of the landing facility. In the presence of wind the path is modified by guiding the aircraft to a turn circle that is displaced from the no-wind position by a distance equal to the negative of the wind drift the aircraft will experience during its flight. The vertical projection of the programmed path consists of level flight at a designated cruise altitude, a descent to the altitude at which the final turn is made and level flight at the altitude of the turn circle.

In the search for a usable ETA, cruise velocity and, to a lesser extent, cruise altitude are the variable parameters. If an unoccupied ETA can not be attained within the economical range of variation of these parameters, orbiting at cruise altitude is resorted to. When an ATA has been established the computer issues to the aircraft over a radio communications link heading, altitude, ahead or behind, start descent, stop descent and start turn commands to maintain programmed flight of the aircraft. In using speed variation as the principal control parameter to insure arrival of the aircraft at the ATA, advantage is taken of the fact that the curve between velocity and minimum fuel consumption per mile is flattest in the neighborhood of the point of minimum fuel consumption. This permits velocity change over a considerable range without appreciable effect on the rate of fuel consumption.

A more detailed description of the invention will be given in connection with the specific embodiment thereof shown in the accompanying drawings, in which FIG. 1 is a block diagram showing the major components of the control system;

FIG. 7 illustrates schematically the phases sensitive servo used in the computer;

FIGS. 8 and 8a show details of a mechanism used in the computer for producing a shaft rotation equal to the absolute magnitude of another shaft rotation;

FIGS. 9 and 10 illustrate the design of function generators used in the computer;

Figure 1:
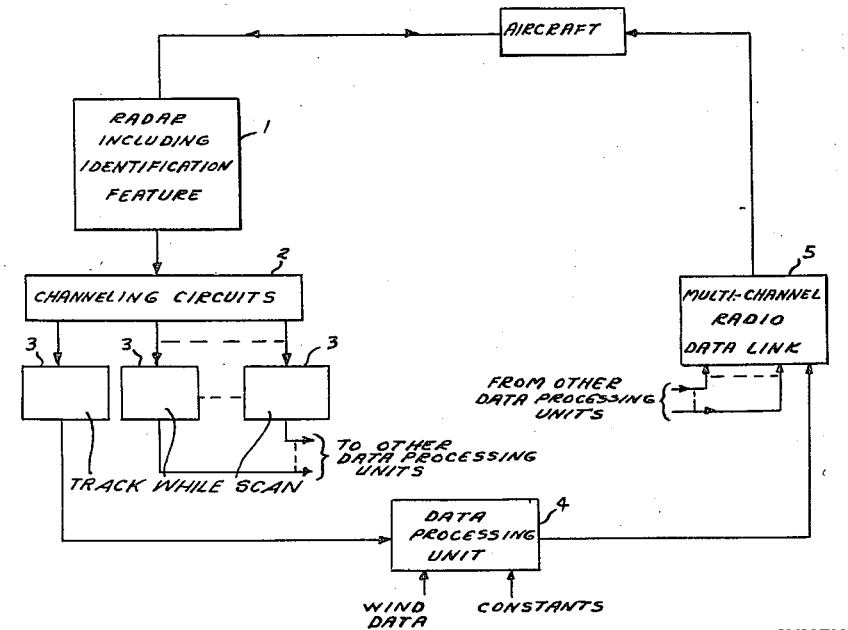

Referring to FIG. 1, the radar equipment 1 is preferably a secondary radar, i.e., one in which each aircraft is equipped with a transponder that responds to an interrogating pulse from the ground radar with a return transmission containing an identifying code. Primary radar, in which the return transmission is due to reflection from the aircraft alone, may be employed but with such radar range is reduced and tracking and identification are made more difficult. The radar 1 may also be of both secondary and primary types in order to accommodate both aircraft with and aircraft without transponders in the traffic control system.

The outputs of radar 1 corresponding to each of the aircraft under surveillance and each containing an identifying code are applied to channeling circuits 2 which respond to the codes to direct the radar signal corresponding to each aircraft to a separate track-while-scan (TWS) unit 3, there being one such unit assigned to each aircraft under control. The TWS units convert the intermittent output of the radar into a continuous output suitable for use in a computer. They also convert the radar output from polar form to rectangular coordinate form.

The output of each TWS unit is applied to a data processing unit or computer 4, there being one of these assigned to each aircraft also. When an ATA for any particular aircraft has been established the computer 4 for that aircraft generates control commands to direct the aircraft in accordance with the computed program for bringing the aircraft to the landing facility entry gate at its assigned time of arrival. These commands are transmitted to the various aircraft over multichannel radio data link 5.

Equipments are available for performing the functions of elements 1, 2, 3 and 5 of FIG. 1 and the specific details of these elements form no part of the invention. The design details of a suitable data processing unit 4 will be given later in this description.

Figure 2:
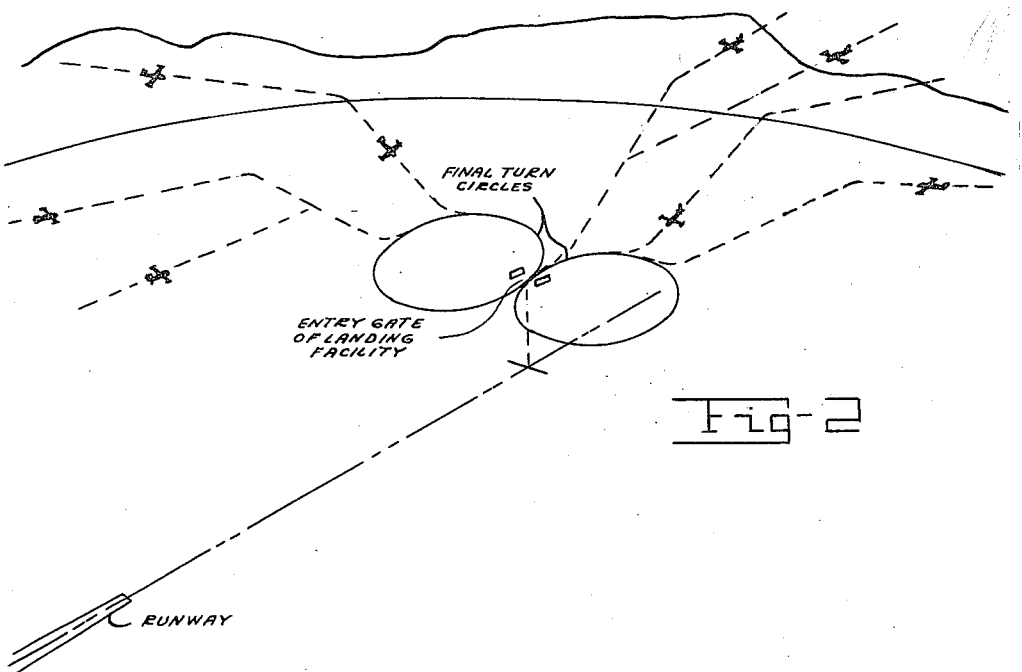
FIG. 2 is a pictorial view of the programmed flight paths.
Figure 3:
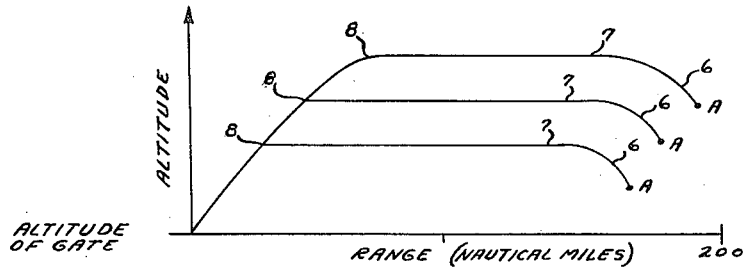
FIGS. 3 and 4 are vertical and no-wind horizontal projections respectively of the flight paths.
Figure 4:
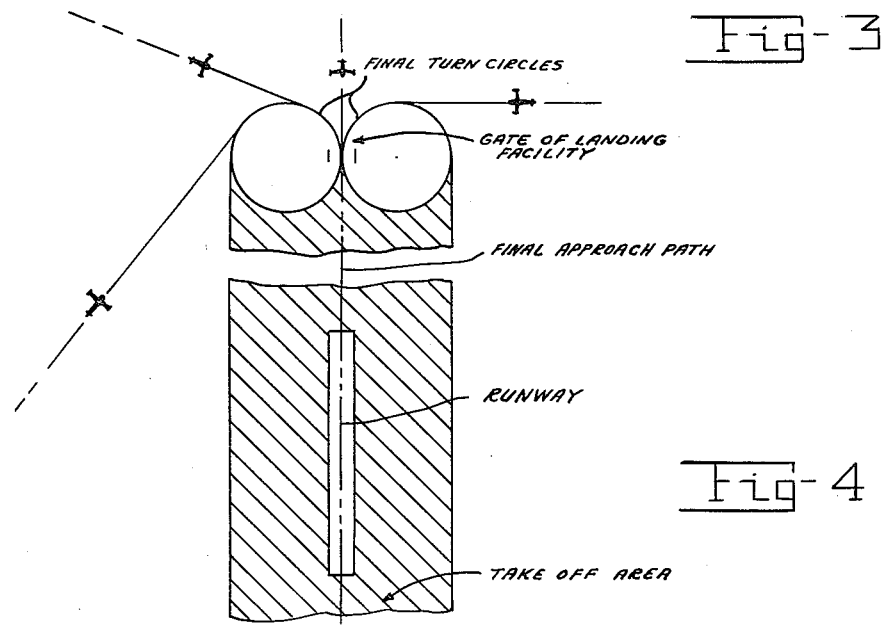

Referring to FIG. 2, there are shown a number of aircraft approaching the landing facility entry gate under control of the described system. The paths flown by the aircraft are shown in dotted lines and are seen to be tangent to left or right final turn circles. The conditions shown are those existing in the absence of wind. Vertical projections of the paths are shown in FIG. 3. All are similar, each consisting of a climb (or descent) 6 of the aircraft A to cruise altitude 7, level flight at the cruise altitude until point of descent 8 is reached. A standard descent from point 8 to the altitude of the landing facility entry gate, and finally a standard turn around the turn circle to the entry gate. The horizontal projections are shown in FIG. 4 and are seen to be straight lines tangent to the final turn circles. The computer 4 of FIG. 1 programs the flight of the aircraft from the point where it reaches cruise altitude to the entry gate of the landing facility, insuring that it reaches this gate at its assigned time of arrival. The presence of wind complicates this programing. The manner in which the computer takes the effect of wind into account is illustrated in FIG. 5.

Figure 5:
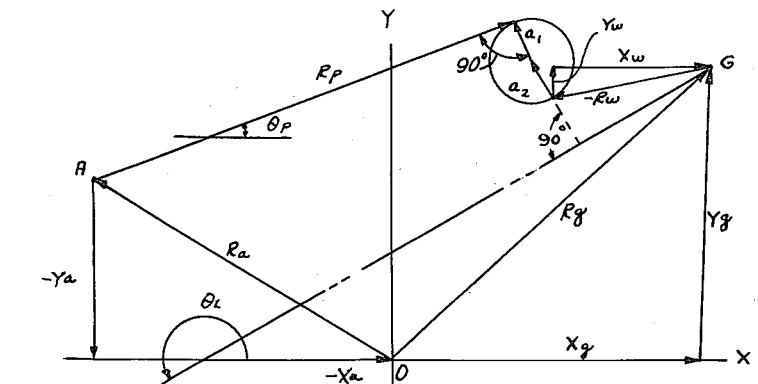
FIG. 5 is a vector diagram showing the horizontal distances travelled in the programmed flight path in the presence of wind.

In the geometrical diagram of FIG. 5, the ground radar station is located at O, the runway at L, the entry gate of the landing facility at G and the aircraft at A. In flying from A to G in the presence of wind the total distance traveled by the aircraft is the vector sum of the motion of the aircraft in the air mass and the motion of the air mass itself, the latter distance being termed the drift. The computer takes drift into account by directing the aircraft to fly a course tangent to a turn circle that is displaced by the negative of the drift $R_w$ that the aircraft will experience during its flight. The proper heading for this course is $\theta p$ as shown in the diagram. Therefore in flying from A to G the aircraft travels in the air mass horizontal distances represented by vectors $R_p$, $a_1$ (normal to $R_p$) and $a_2$ (normal to the line GL) and drifts a distance represented by vector $R_w$, the sum of these vectors equaling the distance from A to G. When the aircraft reaches G the turn circle is in its normal position tangent to the runway center line at G.

Figure 6:
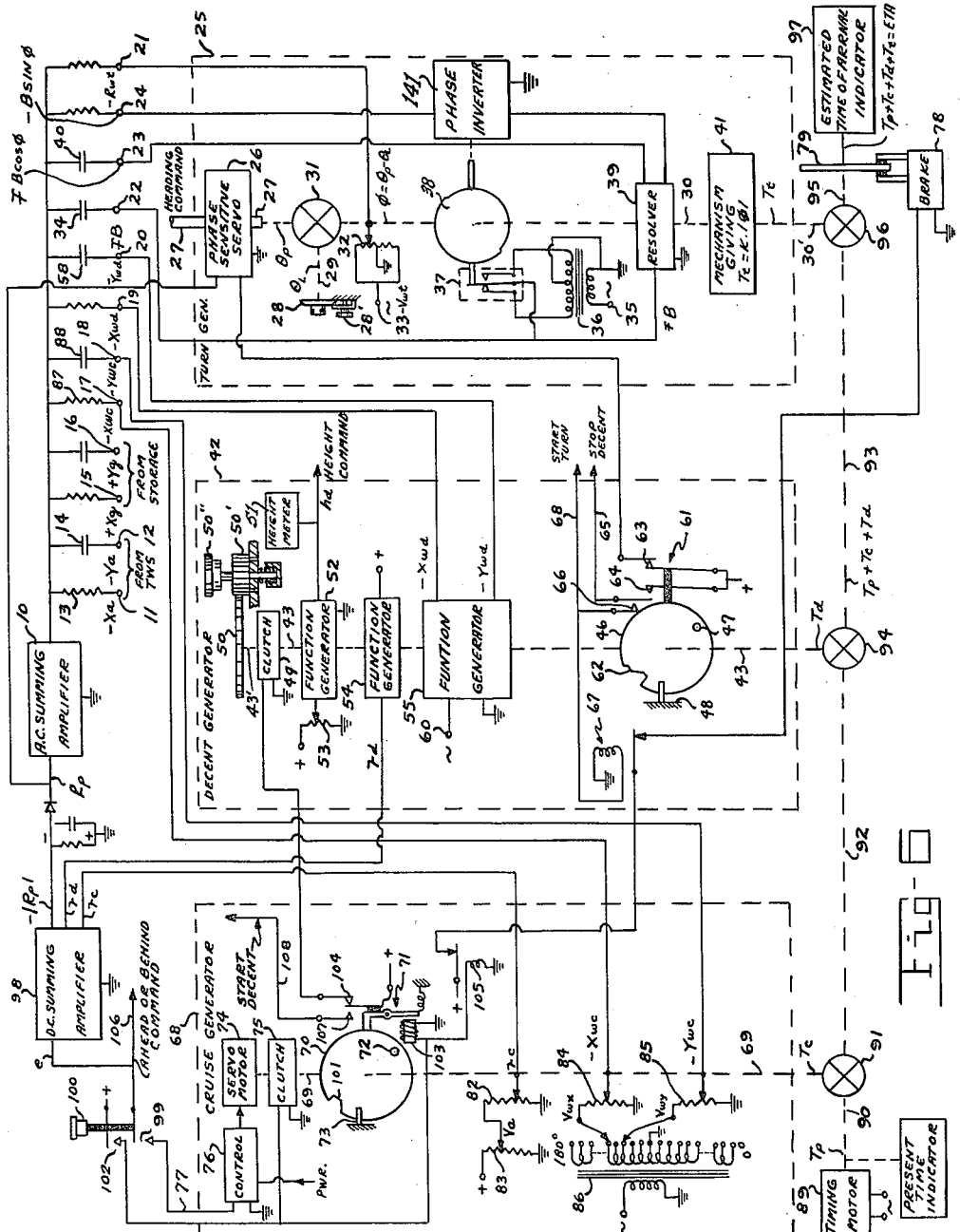
FIG. 6 is a schematic diagram of the flight program computer.

A suitable design of computer 4 (FIG. 1) for programing flight of the aircraft from A to G is shown in FIG. 6. Since alternating voltages obey the same laws of addition as two dimensional space vectors this method of representing vectors is used in the computer.

Referring to FIG. 6, the A.C. summing amplifier 10 produces an alternating voltage in its output the magnitude of which is proportional to the vector $R_p$, representing the horizontal distance flown by the aircraft during the cruise and descent phases of its programmed flight, and the phase of which represents $\theta p$, the required heading of the aircraft. With respect to an X-Y rectangular coordinate system having its origin at O (FIG. 5), $$R_p = -R_a + R_g - R_w + a_2 + a_1$$

This vector addition is performed by the summing amplifier, the terms of the right hand member of the equation representing the inputs to the amplifier. Before application to the amplifier these inputs are broken down as follows:

—$R_a$: This vector is formed in the input of amplifier 10 from alternating voltages —$X_a$ and —$Y_a$ supplied by the TWS equipment to terminals 11 and 12, respectively, and proportional in magnitudes to the X and Y components, respectively, of $R_a$. The voltage —$X_a$ is applied to the amplifier through resistor 13 and the voltage —$Y_a$ through condenser 14. The input impedance of the amplifier is resistive and low relative to the reactance of condenser 14 which equals the resistance of resistor 13. With this arrangement a 90° phase difference exists between —$X_a$ and —$Y_a$ in the amplifier input the same as in FIG. 5.

$R_g$: This vector is generated in the input of the amplifier by applying alternating voltages $X_g$ and $Y_g$, representing the X and Y components of $R_g$, to terminals 15 and 16. The required 90° phase separation is obtained as for $R_a$. These voltages do not vary for any particular runway and are obtained from storage.

—$R_w$: The total drift is broken down into drift during cruise, drift during descent and drift during turn. For cruise and descent the X and Y components (—$X_{wc}$, —$Y_{wc}$) and (—$X_{wd}$, —$Y_{wd}$) are applied to terminals 17, 18 and 19, 20, respectively. For turn, the voltage —$R_{wt}$, representing the total drift during turn, is applied to terminal 21. These drift representing alternating voltages are derived from the cruise, descent and turn generators to be described later.

$a_1 + a_2$: This term is generated in the input of the amplifier by applying to terminal 22 an alternating voltage B whose amplitude represents the radius of the turn circle and whose phase represents the direction of the final approach path; by applying to terminal 23 a voltage $\mp B \cos \phi$, where $\phi$ is the difference between the headings of the aircraft before and after the turn; and by applying to terminal 24 a voltage $\pm B \sin \phi$. These voltages are derived from the turn generator as will be explained later.

The turn generator, shown as element 25 in FIG. 6, generates voltages representing the vectors $a_1$, $a_2$ and $R_{wt}$. It also produces a shaft rotation representing the difference in aircraft headings before and after the turn around the final turn circle and the time required to execute the turn. The vectors $a_1$ and $a_2$ each have a magnitude equal to the radius of the final turn circle and, as previously indicated, the direction of $a_1$ is always normal to $R_p$ and the direction of $a_2$ is always normal to the final approach path GL. The quantity $(a_1 + a_2)$ represents the distance traversed by the aircraft during final turn neglecting the wind and $R_{wt}$ is the wind drift during the time of the turn.

The voltage $R_p$ from the output of amplifier 10 is fed to phase sensitive servo 26 which positions shaft 27 to an angle equal to the phase of $R_p$. A suitable servo for this purpose is shown in FIG. 7 and will be explained later. This phase, and therefore the position of shaft 27, represents the aircraft heading $\theta_p$ before the turn. The angle $\theta_L$ is set in manually through dial 28, having locking device 28', and shaft 29 and represents the heading of the aircraft after the turn. The difference between these two angles $\phi = \theta_p - \theta_L$, obtained at shaft 30 by mechanical differential assembly 31, represents the angle through which the aircraft must turn. The angle $\phi$ may be positive or negative depending upon the direction of the turn, $\phi$ being positive $(\theta_p > \theta_L)$ for a right turn and negative $(\theta_p < \theta_L)$ for a left turn. Since the final turn is a standard coordinated turn made at constant velocity, the time required to execute the turn is proportional to the magnitude of the turn and, therefore, proportional to the absolute value of the rotation of shaft 30 from its $\phi = 0$ position.

The vector —$R_{wt}$, representing the negative of the wind drift during turn, is applied to the terminal 21 of the summing amplifier 10 input in the form of an alternating voltage having a magnitude proportional to the wind velocity at turn altitude and the time of the turn and a phase angle opposite to the wind direction. This voltage is generated by linear potentiometer 32 driven from shaft 30. This potentiometer is energized at terminal 33 by an alternating voltage $-V_{wt}$ having a magnitude proportional to the wind velocity at turn altitude and a phase angle opposite to the wind direction. Potentiometer 32 serves the purpose of multiplying this voltage by the time of the turn to produce $-R_{wt}$.

The vector $a_2$ (FIG. 5) is generated in the input of amplifier 10 by applying to terminal 22 an alternating voltage B having a magnitude proportional to the radius of the final turn circle, determined by the characteristics of the aircraft, and a phase representing the direction $\theta_L$ of the final approach path or the reverse of this direction depending upon the direction of the final turn. Condenser 34 shifts the phase of this voltage 90° to a direction normal to the final approach path as required for vector $a_2$. To produce the voltage B an alternating voltage having an amplitude proportional to the radius of the final turn circle and a phase corresponding to or having a 180° relation to the final approach heading $\theta_L$ is applied to terminal 35. Transformer 36 may have a 1:1 ratio between its primary and each half of the center tapped secondary and operates in conjunction with switch 37, actuated by cam 38, as a phase reversing device. The arrangement is such that when $\phi$ is positive (right turn) the voltage at terminal 22 is $-B$ the phase of which is opposite to that representing the final turn heading $\theta_L$ so that the 90° advance resulting from condenser 34 produces a phase corresponding to the direction of $a_2$ in FIG. 5. When $\phi$ is negative (left turn) the voltage at terminal 22 is $+B$ the phase of which is reversed with respect to that of $-B$ so that vector $a_2$ has a direction opposite to that in FIG. 5. The transition between the two phases is effected by cam 38 as it passes through the $\phi=0$ position of shaft 30.

The voltage $\mp B$ is also used to generate the vector $a_1$ in the input of amplifier 10, this vector being introduced in the form of two components one parallel to and the other normal to the final approach path. The voltage $\mp B$ is applied to resolver 39 which produces a voltage $\mp B \cos \phi$ at terminal 23 and a voltage $-B \sin \phi$ at terminal 24. The phase inverter 141 actuated by shaft 30 as it passes through zero operates to maintain the same phase of $-B \sin \phi$ for both $+$ and $-B$ inputs since the component of $a_1$ parallel to the final approach path has the same direction for both right and left turns. This phase inverter may be similar to the inverter comprising elements 36 and 37 already described. Since the direction of the normal component of $a_1$ is opposite for right and left turns the phase of $B \cos \phi$ is permitted to change with that of B. The phase of $-B \sin \phi$ is not changed in application to the amplifier 10 input, however that of $\mp B \cos \phi$ is rotated 90° by condenser 40 in order to bring this component of $a_1$ around to a direction normal to the final approach path.

The time required for the final turn is proportional to the angle of rotation of shaft 30 from its $\phi=0$ position in either direction. In order to provide a unidirectional shaft rotation proportional to the time of turn $T_t$, a mechanism 41 is inserted between shaft 30 and shaft 30' such that shaft 30' rotates in only one direction and its angle of rotation is proportional to the angle of rotation of shaft 30 in either direction. A suitable mechanism for accomplishing this is shown in FIG. 8 and will be described later.

The descent generator is contained within block 42 of FIG. 6. This generator produces $X_{wd}$ and $Y_{wd}$, the X and Y components of the drift during descent; $r_d$, the horizontal distance traveled by the aircraft during descent in the absence of wind; and $h_d$, the programed aircraft altitude. The generator has a shaft 43 which during descent is driven clockwise at a speed proportional to time through differential gear assembly 94 in a manner which will be explained later. The shaft 43 carries a cam 46 for which a clockwise limit is provided by pin 47 and stop 48. Clutch 49, engaged when energized, is provided for coupling shaft 43 to shaft 43' or decoupling as required. Shaft 43' carries gear 50 which engages pinion 50' on the shaft of locking knob 50''. Shaft 43 may be manually set to any position by first energizing clutch 49 and then rotating knob 50'' after lifting it slightly to disengage its locking pin. The angular displacement of shaft 43 from its clockwise stop is proportional to the time required for the aircraft to descend from the current altitude indicated by height meter 51 to the altitude of the final turn circle including a short stretch of level flight before starting the turn.

Like the final turn, the descent part of the program is made a standard maneuver. The simplest descent for the pilot to execute is one in which the aircraft flies at a constant indicated air speed (IAS) and descends at a constant rate. For this type of descent function generator 52 may be a linear potentiometer having an output proportional to the counterclockwise rotation of shaft 43 from its clockwise stop. Different rates of descent for different aircraft are obtained by varying the energizing voltage for function generator 52 through appropriate adjustment of potentiometer 53. Direct current energization is shown but A.C. may be employed if desired. The output of function generator 52 operates height meter 51 and also serves as the altitude command signal for the aircraft. For aircraft which may not use constant rates of descent the function generator 52 may take the form described below for the generation of $r_d$.

The quantity $r_d$, the distance traveled by the aircraft during descent in the absence of wind, is a nonlinear function of time for the above described standard descent. The function generator 54 for producing $r_d$ may take the form shown in FIG. 9. It consists of a linear potentiometer 55 with a number of taps. Resistors $R_1$, $R_2$, $R_3$ and $R_4$ are used to shunt the sections of the potentiometer between the taps and their values are selected so that the output voltage as a function of shaft rotation approximates range as a function of time during descent.

The quantities $X_{wd}$ and $Y_{wd}$ representing the X and Y components of the drift experienced by the aircraft during descent are produced by function generator 55. The winds encountered during descent may vary in both intensity and direction with altitude and it is necessary to take these variations into account. Wind data at various altitudes is supplied to the operator by the weather service. With this information and the descent characteristic of the airplane it is possible for the operator to compute the X and Y components of the drift experienced by the aircraft in the vicinity of each of a number of equally spaced discrete altitudes between cruise altitude and that of the final turn circle. By summing these drifts a curve of integrated wind drift versus time to descend is produced and the function generator 55 is made to conform to this curve. Therefore at each altitude or instant in the descent the outputs of function generator 55 are the X and Y components of the wind drift to be experienced during the remainder of the descent.

Figure 10:
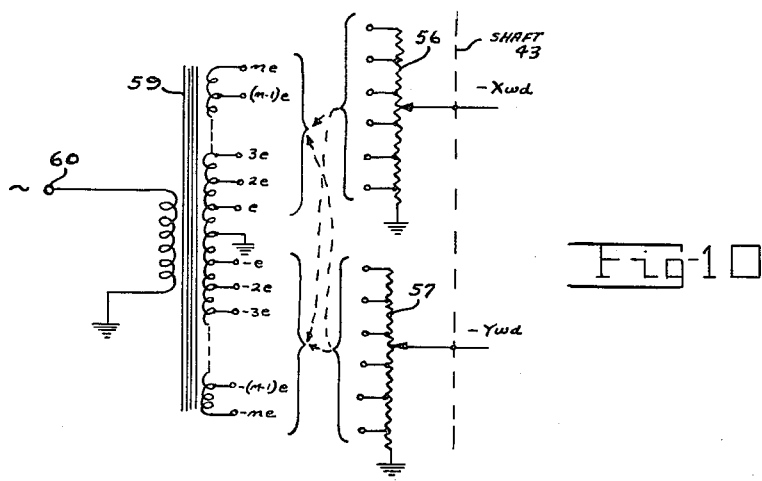

A suitable embodiment of the function generator 55 is shown in FIG. 10. Two linear potentiometers 56 and 57 are driven in step by shaft 43. Since the position of shaft 43 represents the time-to-go to the end of the descent operation, each point on these potentiometers represents a time-to-go. The potentiometer 56 is so energized by alternating current that the voltage at each point thereon has a magnitude approximately proportional to the X component of the drift to occur during the remainder of the descent. Its phase depends upon whether the component is positive or negative. If positive, the phase is 0 or that of the positive X-axis (FIG. 5). If negative, the phase is 180° or that of the negative X-axis. The X component is applied through terminal 19 (FIG. 6) to the amplifier 10 input without change in phase.

Similarly, potentiometer 57 is so energized with alternating current that the voltage at each point thereon has a magnitude approximately proportional to the Y component of the drift to occur during the remainder of the descent. As for the X component, if the Y component is positive the phase of the voltage is 0° and if negative the phase is 180°. However, these voltages are applied to terminal 20 (FIG. 6) and are advanced 90° in phase by condenser 58 before reaching the input of amplifier 10. In the amplifier input, therefore, these voltages have phases of 90° and 270° corresponding to positive and negative Y components, respectively.

The potentiometers 56 and 57 are energized by connecting their taps to appropriate taps on the secondary of transformer 59 which is energized with alternating current of proper phase at terminal 60. The secondary is center tapped so that voltages of either of the two required opposite phases are available. A sufficient number of taps are provided on the secondary to supply the voltage range required to energize the potentiometers in accordance with the curves between X and Y integrated drift components and time-to-go derived as explained above.

Returning to FIG. 6, cam 46 actuates switch 61 near and at the end of the descent operation. When the aircraft is near the end of the descent but still several miles from the point of tangency with the final turn circle the follower of switch 61 rests on step 62 of the cam which provides sufficient movement to open contacts 63 but not close contacts 64. The breaking of contacts 63 deenergizes the servomotor 26 and freezes the heading command on shaft 27. This is done to avoid the rapid change in heading and resulting spiraling effect that usually occurs near the end of a pursuit course. At the end of the descent program contacts 64 close energizing the STOP DESCENT command circuit 65. After a brief interval, sufficient to allow a short distance of level flight before starting the turn, contacts 66 close energizing the START TURN command circuit. Closure of contacts 66 also energize relay 67 for reasons which will be explained later.

The cruise generator portion of the computer is shown in block 68 of FIG. 6. This generator produces $r_c$, the magnitude of the horizontal distance traversed by the aircraft during the cruise phase in the absence of wind; $X_{wc}$, the X component of the wind drift during cruise; and $Y_{wc}$, the Y component of the wind drift during cruise. The generator has a shaft 69 on which is mounted a cam 70 for actuating switch and latch mechanism 71. During programed flight shaft 69 is driven in a clockwise direction at a speed proportional to time through differential gear assembly 91 in a manner to be described later. The angle through which the shaft must rotate to reach its clockwise limit, defined by pin 72 and stop 73 and also by the latch mechanism 71, is always proportion to the remaining programed cruise time. Prior to the start of programed flight the annular position of shaft 69 is initially set by servomotor 74 acting through engaged-when-energized clutch 75 in a manner to be described later. Control circuit 76 for servomotor 74 responds to a direct current error signal on conductor 77 to cause rotaiton of motor 74 in either direction depending upon the polarity of the error signal. Control circuits of this type are well known in the art and need not be explained in detail.

The quantity $r_c$, representing the magnitude of the horizontal distance to be traversed during cruise in the absence of wind, is proportional to the product of aircraft velocity and time to cruise. This product is formed by potentiometer 82 driven by shaft 69. The potentiometer is energized by a direct voltage $V_a$ proporitonal to true air speed. This voltage may be manually varied by potentiometer 83 to permit the insertion of various aircraft velocities into the computer.

The quantities $X_{wc}$ and $Y_{wc}$, representing the X and Y components of the drift during cruise, are generated by linear potentiometers 84 and 85 which are driven in step by shaft 69. These potentiometers are energized by alternating voltages $V_{wx}$ and $V_{wy}$ representing the X and Y components of wind velocity at cruise altitude. The voltages are derived by connecting the potentiometers to the proper taps on the center-tapped secondary of transformer 86. The secondary of this transformer is supplied with a sufficient number of taps to adequately cover the ranges of $V_{wx}$ and $V_{wy}$. With the direction of the positive X-axis of FIG. 5 as zero phase, the upper half of the secondary of transformer 86 has a phase of 180° and the lower half has a phase of 0°. Since it is the negative of the wind drift that is applied to the computer, the potentiometers are energized from the upper half of the secondary for positive components of wind velocity and from the lower half for negative components. These settings are made by the operator from computations made from supplied wind data. The $-X_{wc}$ component of drift having a phase of 0° or 180° is applied to the input of amplifier through terminal 17 and resistor 87 without change in phase. The $-Y_{wc}$ component, which also has a phase of 0° or 180° at potentiometer 85, is applied to terminal 18 and thence through condenser 88 to the amplifier input. The condenser advances the phase of this component by 90° thus correcting it to 90° or 270° as required to align the vector parallel to the Y-axis.

Figure 12:
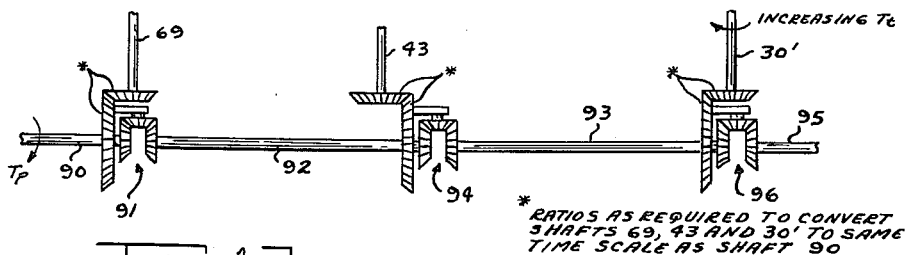
FIG. 12 illustrates the differential gear assemblies used to interconnect the cruise, descent and turn generators of the computer.

Timing motor 89 provides present time $T_p$ on shaft 90. This shaft is coupled to shaft 95 through differential gear assembly 91, shaft 92, differential gear assembly 94, shaft 93 and differential gear assembly 96. Also, shafts 69, 43 and 30' are coupled to differential gear assemblies 91, 94 and 96, respectively, the arrangement being shown in more detail in FIG. 12. As already stated the counterclockwise displacement of shaft 69 from its clockwise stop is proportional to the cruise time $T_c$, the counterclockwise displacement of shaft 43 from its clockwise stop is proportional to the time required for descent $T_d$ and the rotation of shaft 30' from its zero position is proportional to the time required for the final turn $T_t$. The arrangement is such that each of these shaft displacements is added to the displacement of the present time shaft $T_p$ so that the angular position of shaft 95 represents the time $$T_p + T_c + T_d + T_t$$

or the estimated time of arrival (ETA) at the entry gate of the landing facility. The ETA may be displayed by a suitable indicator 97. Shaft 95 and indicator 97 may be locked in any desired position by engaged-when-energized brake 78 acting on disc 79.

The amplifier 98 is of any suitable type capable of adding a plurality of direct voltage inputs of either polarity to produce their algebraic sum. The inputs to this amplifier are the positive direct voltage $r_c$ from cruise generator 68, the positive direct voltage $r_d$ from descent generator 42 and the negative direct voltage $-|R_p|$ representing the magnitude of $R_p$ and derived by rectifying the output of alternating current summing amplifier 10. The output $e$ of amplifier 98 is therefore given by the expression $$e = -|R_p| + r_c + r_d$$

This voltage which, as will be explained later, constitutes the AHEAD or BEHIND command also serves as an error signal in the initial adjustment of the cruise generator and for this purpose is applied to normally open contacts 99 of switch 100.

In placing the aircraft under control of the flight program computer the operator first instructs the aircraft over the radio link to climb (or descend) to a designated cruise altitude and to fly at the speed giving minimum fuel consumption per mile at that altitude. Once the cruise altitude is known the current cruise wind conditions for cruise and the current wind conditions for descent may be set into the computer at potentiometers 84 and 85 of the cruise generator and at function generator 55 of the descent generator. Also, if necessary, the desired rate of descent is set at potentiometer 53 of the descent generator and the function generators 52 and 54 are made to conform to the descent characteristics of the particular aircraft.

After the above parameters have been set into the computer the only additional adjustments to be made before bringing the aircraft under its control are the initial adjustment of the cruise generator and the descent generator shafts. Prior to making these adjustments the computer will normally be in the condition reached at the end of a cycle of operation. In this condition shaft 69 of the cruise generator is locked in its most clockwise ($T_c=0$) position by latch 71 in slot 101. Also, shaft 43 of the descent generator is in its most clockwise ($T_d=0$) position. When shaft 43 is in this position relay 67 is energized and, as the result, brake 78 is deenergized. Shaft 30' of the turn generator will be in a position corresponding to the final value of $T_t$ in the preceding problem. Therefore, under these conditions, shaft 95 is driven from present time shaft 90 through differential 91, shaft 92, differential 94, shaft 93 and differential 96 and its angular position is advanced beyond that of shaft 90 by the amount of the angular displacement of shaft 30'.

The initial settings of the cruise generator and descent generator shafts are accomplished by depressing switch 100 and holding it in its depressed condition. This applies positive voltage through normally open contacts 102 to clutch 75 coupling shaft 69 to servomotor 74, to coil 103 of latch mechanism 71 releasing shaft 69 for counterclockwise rotation and closing contacts 104, and to relay 105 opening its contacts and breaking the energizing circuit of brake 78. Closure of contacts 104 energizes clutch 49 coupling shaft 43' to shaft 43 in the descent generator. Knob 50" is then unlocked and shaft 43 rotated, through shaft 43' and clutch 49, until height meter 51 indicates the designated cruise altitude. This results in a counterclockwise rotation of shaft 43 through an angle from its clockwise limit proportional to the cruise altitude. Near the beginning of the counterclockwise rotation contacts 66 open deenergizing relay 67 and allowing its contacts to close. However, this does not energize brake 78 because of the open circuit at relay 105. When the height meter indicates the correct altitude, knob 50" is relocked which locks shaft 43 at its corresponding counterclockwise displacement for as long as clutch 49 is energized. The descent generator now supplies correct values of $h_d$, $r_d$, $-X_{wd}$, $-Y_{wd}$ and $T_d$.

Depression of switch 100 also applies output voltage $\pm e$ of amplifier 98 to control circuit 76. The control circuit causes motor 74 to rotate shaft 69 through clutch 75 in such direction as, through changing $r_c$ to bring $r_c+r_d$ into equality with $|R_p|$ and $e$ to zero. Initially the required rotation is counterclockwise because the initial adjustment is made from the $r_c=0$ position; however, rotations in either direction may be required as, for example, when speed or altitude are altered in attempting to produce a nonconflicting time of arrival. When the $e=0$ condition is attained shaft 69 has a counterclockwise angular position proportional to the cruise time computed for the present position of the airplane.

After descent generator 42 has been initially set as explained above and switch 100 has been held in its depressed position long enough for the computer to have reached a steady state, the angular position of shaft 69 will be proportional to the cruise time, the angular position of shaft 43 will be proportional to the time required for descent and the angular position of shaft 30', positioned by servo 26 in accordance with the phase of $R_p$, will be proportional to the time required to execute the final turn, all computed from the present position and present required heading of the aircraft. Therefore shaft 95 and indicator 97 will give the estimated time of arrival (ETA) at the entry gate of the landing facility.

Figure 11:
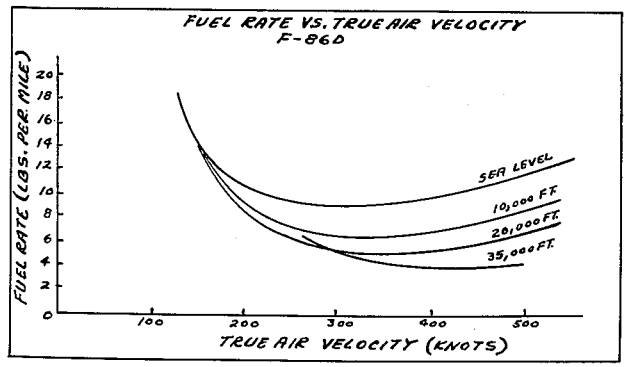
FIG. 11 shows the relationships between fuel consumption, speed and altitude for jet aircraft.

If the indicated ETA does not conflict with a time of arrival already assigned to another aircraft it becomes the assigned time of arrival (ATA) and the aircraft is placed on programed flight by releasing switch 100. If the ETA conflicts with the ATA of another aircraft it will be necessary to change to a nonconflicting ETA. The parameters used for changing the ETA are the program velocity and the cruise altitude. Since the aircraft was initially instructed to fly at the velocity of lowest fuel consumption per mile at the designated cruise altitude considerable variation of velocity on either side of this point is possible without appreciable change in the rate of fuel consumption as shown in FIG. 11. If an unassigned ETA cannot be found within the economic range of velocity variation at this cruise altitude another cruise altitude may be investigated by appropriate adjustment of knob 50" in the descent generator. If a usable ETA cannot be found within the economic ranges of variation of both of the parameters, the aircraft is then instructed to orbit at cruise altitude until a nonconflicting ETA is possible. By orbiting at the start of the programed flight this maneuver can be accomplished at cruise altitude where fuel consumption is low and at maximum range where the probability of collision is reduced. The search for a usable ETA is carried out with switch 100 depressed so that the computer can adjust itself to any changes introduced in the altitude and speed parameters.

As stated above the aircraft is placed under programed flight by the release of switch 100. Release of this switch immediately releases relay 105 which energizes brake 78 locking shaft 95 and indicator 97 at the ATA. Release of switch 100 also removes the error voltage $e$ from control circuit 76, releases clutch 75 freeing shaft 69 and deenergizes coil 103 of latch mechanism 71. Movement of the latch mechanism, however, is restrained by cam 70 so that contacts 104 remain closed and clutch 49 in the descent generator remains energized.

Since shaft 43 of the descent generator is locked at this time by clutch 49 and locking knob 50", and since the turn generator is so designed that shaft 30' cannot be driven from differential 96 (because of worm gear 124 in FIG. 7, for example), upon release of switch 100 shaft 90 begins to drive shaft 69 in a clockwise direction through differential 91. During the cruise portion of the flight any longitudinal error in the position of the aircraft will cause $|R_p|$ to depart from equality with $r_c+r_d$ resulting in a voltage $e$ in the output of amplifier the polarity of which indicates the sign of the error. This voltage energizes the AHEAD or BEHIND command circuit 106 which signals the pilot over the radio link to increase or decrease in air speed as required to satisfy the equation $|R_p|=r_c+r_d$. The computer responds to a transverse error in the position of the aircraft by computing the new heading required for a tangential approach to the final turn circle. This appears as a change in the phase of $R_p$ in the output of amplifier 10. This phase change acts through phase sensitive servo 26 to produce the new heading command on shaft 27, which is transmitted to the aircraft over the radio link, and to reposition shaft 30' to correspond to the new time required to fly around the final turn circle. A new value of $T_t$ results, since any change in heading moves the point of tangency to the final turn circle and therefore changes the flying distance around the circle. Any change in the angular position of shaft 30' acts through differential 96, shaft 93, differential 94, shaft 92 and differential 91 to add to or subtract from the rotation of shaft 69. In this way the change in $T_t$ effects an equal and opposite change in $T_c$ so that the time of arrival at the entry gate of the landing facility, $T_p+T_c+T_d+T_t$, remains unchanged. The rotation of shaft 30' transferred to shaft 69 results in a change in $r_c$ which acting through amplifier 98 produces an air speed command to the aircraft adjusting its velocity to the new distance to be flown before reaching the final turn circle and restoring the equality between $|R_p|$ and $r_c+r_d$.

At the end of the cruise phase of programed flight pin 72 of cam 70 strikes stop 73, preventing further clockwise rotation of shaft 69, and latch 71 drops into slot 101 locking shaft 69 in its $T_c=0$ position. The operation of latch mechanism 71 removes voltage from contact 104, deenergizing clutch 49 in the descent generator, and applying voltage to contact 107 energizing START DESCENT command circuit 108. This results in a command to start descent being transmitted to the aircraft over the radio link.

Since shaft 69 is locked against further rotation the motion of shaft 90 is now transmitted through differential 91, shaft 92 and differential 94 to shaft 43, driving this shaft, which is now free to rotate because clutch 49 is deenergized, in a clockwise direction. During the descent phase a longitudinal error in aircraft position destroys the equality $|R_p|=r_d$ ($r_c$ being zero) and results, as in the cruise phase, in a voltage $\pm e$ at the output of amplifier 98. This causes an AHEAD or BEHIND to be transmitted to the aircraft for changing its speed as required to bring $|R_p|$ into equality with $r_d$. A transverse positional error causes the generation of a new heading command as in the cruise phase, the resulting motion in shaft 30' of the turn generator being transmitted through differential 96, shaft 93 and differential 94 to shaft 43. Latch mechanism 71 in the cruise generator, by preventing counterclockwise rotation of shaft 69, insures that all of the motion of shaft 30' will be transmitted to shaft 43 regardless of direction. This transmitted motion causes the output of function generator 54 to change its value to represent the proper value of $r_d$ for the new heading. This change acts through amplifier 98 to send an AHEAD or BEHIND command to the aircraft for adjusting its speed to conform with the new distance to be flown to the final turn circle. Also the motion transmitted from shaft 30' to shaft 43 changes $T_d$ by an amount equal and opposite to the change in $T_t$ so that the time of arrival, $T_p+T_d+T_t$, remains unchanged, and acts through function generator 52 to change the height command, causing the aircraft to adjust its altitude so as to be at the altitude of the final turn circle when the STOP DESCENT command is given.

Near the end of the descent phase switch 61 moves to face 62 of cam 46 opening contacts 63 and deenergizing servo 26 of the turn generator. As already stated, this action freezes the heading command and prevents the spiralling that might occur at low values of $R_p$. At the end of descent a further movement of switch 61 occurs closing contacts 64 and energizing STOP DESCENT command circuit 65 causing this command to be transmitted to the aircraft over the radio link. After a brief interval, allowing a short distance of level flight before starting the turn, contacts 66 close energizing START TURN command circuit 68 which command is likewise transmitted to the aircraft. These contacts are timed to close at $T_d=0$ at which time pin 47 rests against stop 48 halting further clockwise rotation of shaft 43. At $T_d=0$ the aircraft is at the point of tangency to the final turn circle and $T_p=ATA-T_t$. $T_t$ is consumed in the standard turn around the circle bringing the aircraft to the entry gate of the landing facility at $T_p=ATA$.

With the START TURN command the computer relinquishes control of the aircraft, the final turn being a standard maneuver and the turn generator having been immobilized when contacts 63 of the descent generator opened near the end of the descent phase. Closure of contacts 66 sending the START TURN command also energizes relay 67 which releases brake 79 allowing the motion of shaft 90, which can no longer be transmitted to shaft 43, to be transmitted to shaft 95. There is no significance to the indicator 97 reading at this time, it being equal to $T_p$ plus the value of $T_t$ at the time contacts 63 opened, and the computer may remain in this end-of-cycle state until assigned a new problem in the manner described above.

The essential features of the overall operation of the computer may be summarized as follows:

(1) Prior to assuming control of the aircraft the computer continuously computes, for a given air speed, cruise altitude, standard descent and standard turn of predetermined radius, the heading, $R_p$ and the ETA at the landing facility gate, $R_p$ being the horizontal distance that the aircraft must travel through the air mass in negotiating the distance between its instant position and the final turn circle. From the designated cruise altitude and descent characteristic the computer determines the $r_d$ component of $R_p$ which is the horizontal distance travelled through the air mass during the descent phase. The $r_c$ component of $R_p$, which is the distance travelled through the air mass during the cruise phase, is determined as the difference between the magnitude of $R_p$ and $r_d$. In making these computations the computer takes into account the predicted movement of the air mass during the flight interval.

(2) If a nonconflicting ETA is indicated, or when a nonconflicting ETA is achieved by variation of either the designated air speed or the designated cruise altitude or both, the ETA becomes the ATA and the aircraft is brought under the control of the computer. The values of $r_c$ and $r_d$ at that instant are established as their program values. Since at that instant $r_c+r_d$ equals the magnitude of $R_p$, the aircraft is brought under control with no initial longitudinal displacement error. After controlled flight is instituted, $R_p$ and heading continue to be computed, with the continuous issuance of a heading command.

(3) During the cruise phase $r_d$ is constant and $r_c$ is reduced at program rate determined by the designated air speed. The magnitude of $R_p$ is compared with $r_c+r_d$ and AHEAD or BEHIND commands issued to the aircraft as required to keep the magnitude of $R_p$ equal to $r_c+r_d$.

(4) During the descent phase, which follows the cruise phase, $r_c=0$ and $r_d$ is diminished at program rate determined by the descent characteristic. The magnitude of $R_p$ is compared with $r_d$ and AHEAD or BEHIND commands issued to the aircraft is required to keep the magnitude of $R_p$ equal to $r_d$. Height commands are also issued during the descent phase as determined by the descent characteristic.

(5) During the cruise and descent phases the computer responds to a transverse error in aircraft position by changing the heading command to the correct value for the new position. The computer compensates for the resulting change in the distance to be flown around the final turn circle by an appropriate change in $r_c$ if the transverse error occurs during the cruise phase or in $r_d$ if the error occurs during the descent phase. This results, as above, in the issuance of AHEAD or BEHIND commands as required to return the magnitude of $R_p$ to equality with $r_c+r_d$ or $r_d$ as the case may be.

(6) Near and at the end of the descent phase STOP DESCENT and START TURN commands are issued, the latter at the time $r_d=0$. At this time $R_p=0$ and the aircraft is on the final turn circle with just sufficient time remaining to make a standard constant speed turn around the circle and arrive at the entry gate of the landing facility at the assigned time of arrival.

FIGS. 7, 8, 8a show possible forms that several of the elements of the computer may take. A possible implementation of phase sensitive servo 26 is illustrated schematically in FIG. 7. In this figure the rotor 110 of a synchro transformer 111 is attached to shaft 27 and rotates therewith. The stator windings 112 of this synchro are energized with 3-phase current to produce a revolving magnetic field. This field induces a voltage in rotor winding 110 having the same frequency as the 3-phase currents and having a phase that depends upon the angular position of the rotor relative to the stator. This voltage is amplified and limited by element 113 to produce a rectangular wave 114 of greater amplitude than the alternating voltage representing $R_p$. By means of transformer 115 the square wave is applied between points $a$ and $b$ of a network comprising rectifiers 116, 117, 118 and 119, poled as shown, so that during the positive half-cycles of the square wave when $a$ is positive all rectifiers are conductive and during the negative half-cycle when $a$ is negative none of the rectifiers is conductive. When the rectifiers are conductive, current can flow, during the positive half-cycles of $R_p$, from point $c$ through rectifier 118, the transformer secondary, rectifier 117, resistor 120 and condenser 121 to ground, charging the condenser positively, and during the negative half-cycle of $R_p$, current can flow from ground through condenser 121, resistor 120, rectifier 119, the transformer secondary, and rectifier 116 to point $c$, charging the condenser negatively. If $R_p$ has a quadrature phase relation to the square wave the positive and negative half-cycle charging currents are equal and the net charge on condenser 121 is zero and $V=0$. For 180° on one side of this phase relationship the net charge is positive and V is positive, and for 180° on the other side the net charge is negative and V is negative. Any change in the phase of $R_p$ produces a voltage that acts through amplifier 122 to energize motor 123. This motor drives shaft 27 through worm 124 and gear 125 in the direction, controlled by the polarity of V, required to reduce V to zero and restore the above quadrature phase relation between the square wave and $R_p$. Thus any change in the phase of $R_p$ results in an equal change in the angular position of shaft 27. The zero position of shaft 27 may be adjusted as desired by adjusting the angular position of the synchro stator, as by gear 126, worm 127 and crank 128.

FIGS. 8 and 8a illustrate a suitable design for mechanism 41 of the turn generator. Assuming shaft 30 to be in its zero position and viewing the mechanism in the direction of the arrow, a clockwise rotation of shaft 30 from its zero position produces an equal clockwise rotation of shaft 30' through the differential gears *a—b—c*, shaft 129 and differential gears *d—e—f*, clockwise rotation of gear 130 and counterclockwise rotation of gear 131 being prevented by pin 132 acting against stop 133. A counterclockwise rotation of shaft 30 back toward its zero position likewise acts through the differential gears and shaft 129 to produce the same counterclockwise rotation of shaft 30', counterclockwise rotation of gear 130 and clockwise rotation of gear 131 being prevented by disc 134 which, if rotated counterclockwise by any amount from stop 135, prevents clockwise rotation of disc 136.

Counterclockwise rotation of shaft 30 from its zero position produces an equal clockwise rotation of shaft 30,' through the action of differential gears *a—b—c*, gears 130—137—138—139—131, and differential gears *d—e—f*, clockwise rotation of gears *c* and *d* being prevented by pin 140 acting against stop 135. A clockwise rotation of shaft 30 back toward its zero position produces an equal counterclockwise rotation of shaft 30' toward its zero position through the above chain of gears, counterclockwise rotation of gears *c* and *d* being prevented by disc 136 which, if rotated clockwise by any amount from stop 133, prevents counterclockwise rotation of disc 134.

We claim:

1. A computer for receiving positional information with respect to an aircraft and supplying navigational commands to said aircraft for controlling the flight of said aircraft from the position where control is assumed to a landing facility entry gate located above the extended axis of a runway, said computer comprising means for continuously computing a command heading for said aircraft as the horizontal direction of a vertical plane passing through said aircraft and tangent to a horizontal final turn circle of predetermined radius displaced from a position of tangency at said gate to a vertical plane containing said extended runway axis by an amount equal to the predicted wind drift that the aircraft will experience during the remainder of said flight, means for continuously computing the horizontal straight line distance from the aircraft to the point of tangency of the vertical plane passing through said aircraft with said displaced final turn circle, means operative at the time control is assumed for establishing said computed distance as the program distance that the aircraft must fly relative to the air mass to reach said point of tangency and for decreasing said program distance at a rate conforming to a predetermined program of aircraft air speed, means for continuously comparing said computed distance and said decreasing program distance, and means for producing a speed change command signal when said compared distances differ.

2. A computer for receiving positional information with respect to an aircraft and supplying navigational commands to said aircraft for directing the flight of said aircraft from its position in space when control is assumed to a landing facility entry gate located above the extended axis of a runway, said flight consisting of a cruise phase during which the aircraft flies at a constant designated altitude, a descent phase during which the aircraft altitude is decreased in accordance with a standard descent path to that of said entry gate and a turn phase during which the aircraft makes a standard turn around an arc of a horizontal final turn circle of predetermined radius, said circle at any instant during said flight being displaced from a position of tangency at said gate to a vertical plane containing said extended runway axis by the negative of the predicted wind drift that the aircraft will experience during the remainder of said flight, said computer comprising: means operative during said cruise and descent phases for continuously computing a command heading for said aircraft as the horizontal direction of a vertical plane passing through said aircraft and tangent to said displaced final turn circle, means for continuously computing the total horizontal distance in said heading plane from said aircraft to the point of tangency of the heading plane with said displaced circle, means for computing the program horizontal straight line distance to be travelled by the aircraft relative to the air mass during the descent phase in accordance with said designated cruise altitude and said standard descent path, means operative at the time control of said aircraft is assumed for establishing the difference between said computed total horizontal distance at that time and said program horizontal distance for descent as the program cruise distance and for decreasing said program cruise distance at a rate proportional to a designated cruise air speed, means operative when said program cruise distance equal zero for producing a start descent command signal and for decreasing said program horizontal distance for descent at a rate determined by said standard descent path, means operative during said cruise and descent phases for continuously comparing the value of said computed total distance with the sum of the values of the program cruise distance and the program horizontal distance for descent and for producing an air speed change command signal when the compared values differ, and means operative when said program horizontal distance for descent equals zero for producing a start turn command signal.

3. A computer for receiving positional information with respect to an aircraft and supplying navigational commands to said aircraft for directing the flight of said aircraft from its position in space when control is assumed to a landing facility entry gate located above the extended axis of a runway, said flight consisting of a cruise phase during which the aircraft flies at a constant designated altitude, a descent phase during which the aircraft altitude is decreased in accordance with a standard descent path to that of said entry gate and a turn phase during which the aircraft makes a standard turn around an arc of a horizontal final turn circle of predetermined radius, said circle at any instant during said flight being displaced from a position of tangency at said gate to a vertical plane containing said extended runway axis by the negative of the predicted wind drift that the aircraft will experience during the remainder of said flight, said computer comprising: means operative during said cruise and descent phases for continuously computing a command heading for said aircraft as the horizontal direction of a vertical plane passing through said aircraft and tangent to said displaced final turn circle; means for continuously computing from said heading, the direction of said runway axis and the parameters of said standard turn the interval required to complete said turn phase; means for continuously computing the total horizontal distance in said heading plane from said aircraft to the point of tangency of the heading plane with said displaced circle; means for computing the program horizontal distance to be travelled by the aircraft relative to the air mass during the descent phase and the interval required to complete said descent phase in accordance with said designated cruise altitude and said standard descent path; means operative prior to assuming control of said aircraft for continuously computing the horizontal cruise distance as the excess of said total horizontal distance over said horizontal distance for descent and for continuously computing the corresponding cruise interval from said horizontal cruise distance and a designated cruise air speed; means for continuously adding said turn interval, said descent interval and said cruise interval to present time to determine the estimated time of arrival at said entry gate; means operative at the instant control of said aircraft is assumed for establishing the estimated time of arrival at that instant as the assigned time of arrival, for establishing the value of said horizontal cruise distance at that instant as the program cruise distance and for decreasing said program cruise distance at a rate proportional to said designated cruise air speed; means operative when said program cruise distance equals zero for producing a start descent command signal and for decreasing said program horizontal distance for descent as a function of time in accordance with said standard descent path; means operative during said cruise and descent phases for continuously comparing the value of said computed total horizontal distance with the sum of the values of the program cruise distance and the program horizontal distance for descent and for producing an air speed change command signal when the compared values differ, and means operative when said program horizontal distance for descent equals zero for producing a start turn command signal.

4. A computer for receiving positional information with respect to an aircraft and supplying navigational commands to said aircraft for directing the flight of said aircraft from its position in space when control is assumed to a landing facility entry gate located above the extended axis of a runway, said flight consisting of a cruise phase during which the aircraft flies at a constant designated altitude, a descent phase during which the aircraft altitude is decreased in accordance with a standard descent path to that of said entry gate and a turn phase during which the aircraft makes a standard turn around an arc of a horizontal final turn circle of predetermined radius, said circle at any instant during said flight being displaced from a position of tangency at said gate to a vertical plane containing said extended runway axis by the negative of the predicted wind drift that the aircraft will experience during the remainder of said flight, said computer comprising: means operative during said cruise and descent phases for continuously computing a command heading for said aircraft as the horizontal direction of a vertical plane passing through said aircraft and tangent to said displaced final turn circle; means for continuously computing from said heading, the direction of said runway axis and the parameters of said standard turn the interval required to complete said turn phase; means for continuously computing the total horizontal distance in said heading plane from said aircraft to the point of tangency of the heading plane with said displaced circle; means for computing the program horizontal distance to be travelled by the aircraft relative to the air mass during the descent phase and the interval required to complete said descent phase in accordance with said designated cruise altitude and said standard descent path; means operative prior to assuming control of said aircraft for continuously computing the horizontal cruise distance as the excess of said total horizontal distance over said horizontal distance for descent and for continuously computing the corresponding cruise interval from said horizontal cruise distance and a designated cruise air speed; means for continuously adding said turn interval, said descent interval and said cruise interval to present time to determine the estimated time of arrival at said entry gate; means operative at the instant control of said aircraft is assumed for establishing the estimated time of arrival at that instant as the assigned time of arrival, for establishing the value of said horizontal cruise distance at that instant as the program cruise distance and for decreasing said program cruise distance at a rate proportional to said designated cruise air speed; means operative when said program cruise distance equals zero for producing a start descent command signal and for decreasing said program horizontal distance for descent as a function of time in accordance with said standard descent path; means operative during said cruise and descent phases for continuously comparing the value of said computed total horizontal distance with the sum of the values of the program cruise distance and the program horizontal distance for descent and for producing an air speed change command signal when the compared values differ; means operative when said program horizontal distance for descent equals zero for producing a start turn command signal; and means, including said interval adding means, responsive to a change in said turn interval during said cruise phase for effecting an equal and opposite change in cruise interval and a change in said cruise distance equal in magnitude and sign to the product of the change in cruise interval and said designated cruise air speed, and responsive to a change in said turn interval during said descent phase for effecting an equal and opposite change in said descent interval and a change in said program horizontal distance for descent of the same sign as said descent interval change and having a relation thereto determined by the shape of said standard descent path.

5. A computer for generating navigational commands for directing the flight of an aircraft from its position in space when control is assumed to a landing facility entry gate located above the extended axis of a runway, said flight consisting of a cruise phase during which the aircraft flies at a constant designated altitude, a descent phase during which the aircraft altitude is decreased in accordance with a standard descent path to that of said entry gate and a turn phase during which the aircraft makes a standard turn around an arc of a horizontal final turn circle of predetermined radius, said circle at any instant during said flight being displaced from a position of tangency at said gate to a vertical plane containing said extended runway axis by the negative of the predicted wind drift that the aircraft will experience during the remainder of said flight, said computer comprising: means receiving inputs of aircraft position, entry gate position, predicted drift and turn circle radius for continuously computing a command heading for said aircraft as the horizontal direction of a vertical plane passing through said aircraft and tangent to said displaced turn circle, and for continuously computing the total horizontal distance in said plane from said aircraft to the point of tangency to said displaced turn circle; a turn generator receiving inputs of said command heading, the direction of said runway axis and the radius of said final turn circle for computing the time interval required to complete said turn phase; a descent generator having an input of designated cruise altitude for computing the program horizontal distance to be travelled by the aircraft during the descent phase and the interval required to complete said descent phase in accordance with the shape of said standard descent path and said cruise altitude; a cruise generator having an input of designated cruise aircraft speed and operative prior to the time control of said aircraft is assumed to continuously compute the horizontal cruise distance as the excess of said total horizontal distance over said horizontal distance for descent and for continuously computing the corresponding cruise interval; means interconnecting said turn, descent and cruise generators for continuously adding said turn interval, said descent interval and said cruise interval to present time to determine the estimated time of arrival at said entry gate; means operative at the instant control of said aircraft is assumed for establishing the estimated time of arrival at that instant as the assigned time of arrival, for establishing the value of said horizontal cruise distance at that instant as the program cruise distance and for decreasing said program cruise distance at a rate proportional to said designated cruise speed; means in said cruise generator operative when said program cruise distance equals zero for producing a start descent command signal and for initiating an operation of decreasing said program horizontal distance for descent as a function of time in accordance with said standard descent path; means operative during said cruise and descent phases for continuously comparing said computed total horizontal distance with the sum of said program cruise distance and said program horizontal distance for descent and for producing an air speed change command signal when the compared values differ; and means operative when said program horizontal distance for descent equals zero for producing a start turn command signal.

6. A computer for generating navigational commands for directing the flight of an aircraft from its position in space when control is assumed to a landing facility entry gate located above the extended axis of a runway, said flight consisting of a cruise phase during which the aircraft flies at a constant designated altitude, a descent phase during which the aircraft altitude is decreased in accordance with a standard descent path to that of said entry gate and a turn phase during which the aircraft makes a standard turn around an arc of a horizontal final turn circle of predetermined radius and tangent at said gate to a vertical plane containing said extended runway axis, said computer comprising: means receiving inputs of aircraft position, entry gate position and turn circle radius for continuously computing a command heading for said aircraft as the horizontal direction of a vertical plane passing through said aircraft and tangent to said turn circle, and for continuously computing the total horizontal distance in said plane from said aircraft to the point of tangency to said turn circle; a turn generator receiving inputs of said command heading, the direction of said runway axis and the radius of said final turn circle for computing the time interval required to complete said turn phase; a descent generator having an input of designated cruise altitude for computing the program horizontal distance to be travelled by the aircraft during the descent phase and the interval required to complete said descent phase in accordance with the shape of said standard descent path and said cruise altitude; a cruise generator having an input of designated cruise aircraft speed and operative prior to the time control of said aircraft is assumed to continuously compute the horizontal cruise distance as the excess of said total horizontal distance over said horizontal distance for descent and for continuously computing the corresponding cruise interval; means interconnecting said turn, descent and cruise generators for continuously adding said turn interval, said descent interval and said cruise interval to present time to determine the estimated time of arrival at said entry gate; means operative at the instant control of said aircraft is assumed for establishing the estimated time of arrival at that instant as the assigned time of arrival, for establishing the value of said horizontal cruise distance at that instant as the program cruise distance and for decreasing said program cruise distance at a rate proportional to said designated cruise speed; means in said cruise generator operative when said program cruise distance equals zero for producing a start descent command signal and for initiating an operation of decreasing said program horizontal distance for descent as a function of time in accordance with said standard descent path; means operative during said cruise and descent phases for continuously comparing said computed total horizontal distance with the sum of said program cruise distance and said program horizontal distance for descent and for producing air speed change command signal when the compared values differ; means operative when said program horizontal distance for descent equals zero for producing a start turn command signal; and means, including said interval adding means, responsive to a change in said turn interval during said cruise phase for effecting an equal and opposite change in cruise interval and a change in said cruise distance equal in magnitude and sign to the product of the change in cruise interval and said designated cruise air speed, and responsive to a change in said turn interval during said descent phase for effecting an equal and opposite change in said descent interval and a change in said program horizontal distance for descent of the same sign as said descent interval change and having a relation thereto determined by the shape of said standard descent path.

7. A computer for generating navigational commands for directing the flight of an aircraft from its position in space when control is assumed to a landing facility entry gate located above the extended axis of a runway, said flight consisting of a cruise phase during which the aircraft flies at a constant designated altitude, a descent phase during which the aircraft altitude is decreased in accordance with a standard descent path to that of said entry gate and a turn phase during which the aircraft makes a standard constant speed turn around an arc of a horizontal final turn circle of predetermined radius, the heading of said aircraft during said cruise and descent phases being the horizontal direction of a vertical plane through said aircraft and tangent to said final turn circle which at any instant during said flight, is displaced from a position of tangency at said gate with a vertical plane containing said extended runway axis by the negative of the predicted wind drift that the aircraft will experience during the remainder of said flight, said computer comprising: a vector adder having vector inputs representing the horizontal position of said aircraft, the horizontal position of said gate, the wind drift during the remainder of the cruise phase, the wind drift during the remainder of the descent phase, the wind drift during the turn phase and the magnitude and direction of the displacement of the aircraft relative to the air mass during the turn phase, and having a vector output the magnitude of which represents the total horizontal straight line distance between said aircraft and the point of tangency of said vertical plane through said aircraft and said displaced turn circle and the direction of which represents the command heading for said aircraft; a command heading shaft and means for angularly positioning said shaft in accordance with the direction of said vector output; a turn generator having a first shaft and means responsive to the angular position of said command heading shaft and the direction of said runway axis to angularly position said first shaft from a zero position by an amount equal to the magnitude of the final turn and proportional to the final turn interval and in a direction corresponding to the direction of the final turn, means driven from said first shaft for multiplying a vector representing the magnitude and direction of the wind at the final turn altitude by the final turn interval to provide the turn phase wind drift input to said vector adder, means driven from said first shaft for modifying a vector input having a magnitude proportional to the radius of said final turn circle and a direction representing the direction of said runway axis in accordance with the magnitude of the final turn to produce the turn phase displacement input to said vector adder, a second shaft and means coupling said first shaft to said second shaft for producing an angular displacement of said second shaft from a zero position proportional to the absolute magnitude of the displacement of said first shaft from its zero position; a descent generator having a shaft and means for initially setting and locking said shaft at an angular displacement from a zero position proportional to the descent phase interval, a function generator driven from said shaft and producing a height command signal related to the remainder of the descent interval in accordance with said standard descent path, a function generator driven by said shaft for producing a quantity proportional to the horizontal distance to be travelled by said aircraft during said descent interval as determined by said standard descent path, and a function generator driven by said shaft for converting vector inputs representing the velocities and directions of the winds to be encountered during descent into the vector adder input representing wind drift during the remainder of the descent phase; a cruise generator having a shaft the angular displacement of which from a zero position is proportional to the remainder of the cruise interval, means driven by said shaft for multiplying a quantity representing designated cruise air speed by the remainder of the cruise interval to produce a quantity representing the remaining horizontal cruise distance, and means driven by said shaft for multiplying a vector representing the direction and velocity of the wind at cruise altitude by the remainder of the cruise interval to produce the cruise wind drift input to said vector adder; a shaft the angular position of which represents present time; a shaft the angular position of which represents the ETA; differential gear means for intercoupling said present time and ETA shafts with the shaft of the cruise generator, the descent generator and the turn generator, the intercoupling being such that the angular position of the ETA shaft is advanced beyond the angular position of the present time shaft by the sum of the angular displacements of the cruise, descent and turn shafts from their zero positions; means for deriving the difference between the magnitude of said total horizontal distance and the sum of the magnitudes of the remaining horizontal cruise distance and descent distance as computed by the cruise and descent generators; servomotor means coupled to said cruise shaft and, prior to the time control of said aircraft is assumed, responsive to said difference for rotating said cruise shaft in such direction as to reduce said difference to zero; a locking device for said ETA shaft that is in a released state prior to the time control of said aircraft is assumed; means operative at the time control of said aircraft is assumed for decoupling said servomotor from said cruise shaft and for actuating said ETA shaft locking device thereby initiating said cruise phase; means operative during said cruise and descent phases for producing an air speed change command signal when said difference is greater than zero; means operative when said cruise shaft is in its zero position for producing a start descent command signal and for releasing said descent shaft from its locked condition; and means operative when said descent shaft is in its zero position for producing a start turn command signal and for releasing said ETA shaft locking device.

8. Apparatus as claimed in claim 7 in which there are provided means operative when said cruise shaft reaches its zero position for locking said shaft against rotation in either direction.

9. Apparatus as claimed in claim 7 in which there are provided means operative as said descent shaft nears its zero position to first freeze the angular position of said command heading shaft and later to produce a stop descend command signal.

References Cited in the file of this patent
UNITED STATES PATENTS

| | | |
|---|---|---|
| 2,825,054 | Ernst | Feb. 25, 1958 |
| 2,878,469 | Casabona | Mar. 17, 1959 |
| 2,927,751 | Daspit | Mar. 8, 1960 |